US00RE35912E

United States Patent [19]

Gomez de Rosas et al.

[11] E Patent Number: Re. 35,912

[45] Reissued Date of Patent: Sep. 29, 1998

[54] METHOD OF INSTALLING LEAN-TO WELL PROTECTOR

[76] Inventors: Ricardo R. Gomez de Rosas, 3609 Lake Winnipeg; Esteban O. Suarez, 1728 Lake Michigan Dr., both of Harvey, La. 70058

[21] Appl. No.: 579,061

[22] Filed: Dec. 22, 1995

Related U.S. Patent Documents

Reissue of:

[64] Patent No.: 5,051,036
Issued: Sep. 24, 1991
Appl. No.: 503,134
Filed: Apr. 2, 1990

U.S. Applications:

[63] Continuation of Ser. No. 127,381, Sep. 24, 1993, abandoned, which is a continuation of Ser. No. 428,485, Oct. 31, 1989, abandoned, which is a continuation of Ser. No. 236,637, Aug. 25, 1988, abandoned.

[51] Int. Cl.[6] ..... E02D 5/00

[52] U.S. Cl. ..... 405/227; 405/224; 405/195.1

[58] Field of Search ..... 405/195.1, 203, 405/204, 209, 211, 222, 227; 166/335, 351, 360, 365; 175/9

[56] References Cited

U.S. PATENT DOCUMENTS

| | | | |
|---|---|---|---|
| 2,927,435 | 3/1960 | Upson | 405/227 |
| 3,226,728 | 12/1965 | Walvoord | 166/351 |
| 3,362,170 | 1/1968 | Manning | 175/9 X |
| 4,027,734 | 6/1977 | Horvath | 405/227 X |
| 4,083,193 | 4/1978 | Evans | 405/208 X |
| 4,118,942 | 10/1978 | Liautaud | 405/204 |
| 4,307,977 | 12/1981 | Haney | 405/227 |
| 4,553,878 | 11/1985 | Willemse et al. | 405/203 |
| 4,607,983 | 8/1986 | Meek et al. | 405/204 |
| 4,679,974 | 7/1987 | Blandford | 405/216 |
| 4,687,380 | 8/1987 | Meek et al. | 405/204 |
| 4,740,107 | 4/1988 | Casbarian et al. | 405/195 X |
| 4,818,145 | 4/1989 | Carruba et al. | 405/203 |

OTHER PUBLICATIONS

"Tripod Feasibility Study: South Timbalier Block 50", Gilley & Assoc., Gretna, La., Feb. 19, 1981.

*Primary Examiner*—William P. Neuder
*Attorney, Agent, or Firm*—Pravel, Hewitt, Kimball & Krieger

[57] ABSTRACT

A lean-to well protector apparatus for use on offshore wells having a generally vertical upstanding conductor pipe extending between the sea bed and the water surface includes a pair of jacket legs defining a plane that is angularly oriented with respect to the conductor pipe forming an acute angle therewith. A first plurality of structural chord members interconnects the jacket legs and can occupy the plane defined by the jacket legs. The first plurality of chord members and the jacket legs form a truss that leans towards the conductor pipe during operation of the offshore well. A first clamp connector is positioned at the middle portion of the conductor pipe and a second clamp connector is positioned at the upper portion of the conductor pipe generally near the water surface area. A second plurality of structural chord members interconnects the conductor pipe with the truss at the clamp connectors. At least some of the plurality of structural chord members extends between the truss and the first and second clamp connectors. The apparatus thus uses the conductor pipe as one of the legs of a structural assembly for protecting offshore oil wells.

7 Claims, 6 Drawing Sheets

METHOD OF INSTALLING LEAN-TO WELL PROTECTOR

Matter enclosed in heavy brackets [ ] appears in the original patent but forms no part of this reissue specification; matter printed in italics indicates the additions made by reissue.

[This application is] *This is a continuation of co-pending application Ser. No. 08/127,381, filed on Sep. 24, 1993, which is* a continuation of Ser. No. 07/428,485, filed Oct. 31, 1989 and now abandoned, which is a continuation of Ser. No. 07/236,637, filed Aug. 25, 1988 and now abandoned.

BACKGROUND OF THE INVENTION

1. Field of the Invention

The present invention relates methods of installing offshore oil and gas wells and protective structures and jackets therefor. Even more particularly the present invention relates to a method of installing large structural protector for offshore wells which uses an upstanding conductor pipe installed by a drilling vessel and wherein a lean-to truss having a pair of angled legs is initially supported and installed by the drilling vessel and subsequently forms a structural connection with the conductor pipe to define a three legged structure which includes the conductor pipe for protecting the well. The legs of the angled truss have pre-installed internal piling so that once placed by the rig, they can be quickly driven to affix the truss to the seabed.

A drilling vessel, for example, can be used to drill an oil or gas well in an offshore environment. Such a vessel can be a barge-like floating drilling rig, a jack-up rig, (which elevates a barge body on three or more legs), and in some cases a semi-submersible drilling rig. The vessel supports the drilling portion of the rig at a particular location during drilling of the well.

When the drilling of an offshore oil and gas well is completed, the vessel moves to another location leaving a well behind which includes an elongated generally vertical section of pipe known as the conductor pipe of for example two to three feet in diameter.

A supportive platform must be installed to protect the well from damage such as may occur from collisions by vessels or by weather. The structure is also used to provide a work area that can be occupied by personnel doing work associated with production of the oil and gas well.

Because of the offshore environment, it is often difficult, expensive and/or impossible to fabricate a platform on location. Rather, the practice has been to construct a jacket, support, or other heavy structure on land, and then transport that structure to the offshore environment where it is set in position at the well site. Between the time that the well is drilled and the conductor pipe placed in position, and the time that a more permanent production platform can be installed, the well must be protected. There is thus a need for a support which is quick and easy to assemble, and desirably inexpensive to manufacture. Such a support must necessarily be quickly erected on site in order to protect the well from storms which may occur in the days and weeks after drilling is completed and after the well drilling vessel, jack-up rig, or the like has left the drilling site. The structure can be removed and used at a second location if the first well is plugged and abandoned. Thus the structure has a dual function i.e., a permanent support, or if desired, removable.

2. General Background

Various platforms and offshore structures have been patented which have attempted to solve the problem of protecting the well from damage due to wind, weather, sea conditions, and from collision by other vessels. Many of these devices use a very permanent offshore jacket which is supported by the underlying sea bed. Most of these jackets include multiple legs which are generally vertical (sometimes slanted or battered) and which are interconnected by horizontal and diagonal cross members or chords. Some of these structures form connections with the well drive pipe or conductor pipe. For example, an article in the Jan. 19, 1987 issue of the Oil and Gas Journal describes a two-leg jacket that is clamped and welded, to the well drive pipe to form a tripod. A deck support frame and deck module are supported from the two legs and braced to the drive pipe creating a rigid deck.

The Upson U.S. Pat. No. 2,927,435; the Horvath U.S. Pat. No. 4,027,734; the Evans U.S. Pat. No. 4,083,193; and the Liautaud U.S. Pat. No. 4,118,942 all disclose marine platforms which show permanent rigid jackets that include generally vertical columns interconnected by diagonal and/or horizontal cross members.

In the Upson Patent, a method is provided for constructing an offshore platform foundation which includes individually driving substantially vertically a plurality of piles in spaced-apart relationship with the lower portions of the piles being driven to the sea bottom and the upper portions thereof extending to a substantial height above the water level and thereafter lowering to a substantial distance below the desired platform level. The frame has portions for securing the piles thereto, and also means for guiding and bracing the mid-portions of batter piles to be subsequently driven at angles to the vertically driven piles. As part of the method, the vertically driven piles are secured to the frame in spaced positions and a platform is secured to the upper portions of vertically driven piles at a desired level above the water and a substantial distance above the frame. The platform has batter pile guides and the batter piles are driven from the platform downwardly into the sea bottom at angles to the vertically driven piles while the batter piles are guided respectively by substantially spaced apart guides on the platform and guides on the frame.

In the Horvath U.S. Pat. No. 4,02,734, a method and technique for a non-vertical implacement of a supported conductor casing is provided. The method provides for the installation of a relatively short offset portion of the conductor casing at only the bottom of the conductor pipe string thereby utilizing this offset portion to force the conductor string in a desired direction and orientation by driving or forcing the conductor casing through a substratum in such manner that the casing will assume the desired curvature and direction as it advances through the substratum. In addition to the offset or dogleg segment at the bottom, keyway type guidebars can be added into the longitudinal direction to resist undesired rotation of conductor pipe. The platform area is shown as comprising a plurality of upstanding legs which are downwardly extending into the sea bed and a plurality of vertically spaced cross braces extending between the legs. Guides on the platform support the conductor.

The Evans U.S. Pat. No. 4,083,193 provides an offshore apparatus and a method for installing the offshore apparatus. The structure is mounted on the ocean floor and terminates in a platform located beneath the surface of the water to carry loads extending above the surface of the water. A plurality of legs extend generally vertically through a template base resting on the ocean floor and are anchored in the ocean bed below the base. A load platform is connected to the upper portions of the legs and is buoyant enough to maintain the legs in tension and to support the load which it carries. A stabilizer member is connected to the legs intermediate their length and is also buoyant to apply additional tension to the legs, and a series of mooring members are connected to the stabilizer member to minimize the side sway in response to ocean current. In the preferred method of installation, all three components are buoyant and are towed to the site of operation as a unit, and lowered to the ocean floor by ballasting them with sea water. The legs are installed through passages in the compartments and the platform and stabilizer member are de-ballasted to rise to their final position while the base remains ballasted and serves to maintain the integrity of the anchoring of the legs.

In the Liautaud U.S. Pat. No. 4,118,942 entitled "Marine Platform For Offshore Drilling Operations And The Like". There is provided a marine platform which comprises a caisson unit adapted to be placed onto the submarine ground at a desired offshore site. A tower like tubular structure comprising a plurality of columns extends vertically upwardly from the caisson unit with their lower ends integrally fixed to set caisson units. A deck unit adapted to be provided with petroleum drilling equipment or the like is integrally fixed to the upper ends of the columns. A floating unit is adapted to be displaceably and removably fixed to the columns.

A number of patents relate to devices which include a tripod-like tower structure which supports a centrally positioned conductor pipe. U.S. Pat. No. 4,553,878 issued to Willemse. U.S. Pat. No. 4,607,983 issued to Meek et al., U.S. Pat. No. 4,679,964 issued to Blandford and U.S. Pat. No. 4,687,380 issued to Meek et al., all disclose tripod like structures for supporting a central conductor like element in an offshore environment.

In the Willemes et al., U.S. Pat. No. 4,553,878, an offshore tower structure includes a base structure for positioning on and fixing to the sea bed a central column for containing services such as conductors, risers and extending in use from the base structure to above the water level for supporting a platform, at three supporting legs each extending between an upper portion of the column and the base structure at points spaced from the column provides support for the column and a bracing structure comprises a frame work lying intermediate the ends of the column in a plane perpendicular to the longitudinal axis of the column, the frame work connecting each pair of adjacent legs and each leg directly or indirectly with the column, and bracing elements between the column in the legs or between adjacent legs extend from the plane of the frame work to respected points at or adjacent the base of the structure.

The Meek et al. U.S. Pat. No. 4,607,983 provides a method of constructing an offshore tower structure having a base structure for positioning on the sea bed, a central enclosed tubular column containing services such as conductors and risers and extending from the base structure to above the water level for supporting a service platform which includes positioning the base structure on the sea bed, floating the column and legs over the base structure, lowering the column and legs under the base structure and securing them onto the latter.

The Blandford U.S. Pat. No. 4,679,964 provides a structure for use with a subsea well incorporating an external conductor pipe extending upwardly above the sea bed, a well support mini platform being a portion of the apparatus. A longitudinally split, flange-equipped, bolt joined elongate conductor clamp supported on a frame at the bottom thereof is provided having a plurality of appended upstanding braces. The support frame is adapted to be rested on a sea bed and held in place by a number of anchors driven into the sea bed at corner. Support frame is selectively installed after completion of a well wherein the conductor pipe extends above the sea bed. The support frame may subsequently be removed after installation of a permanent platform. In alternate embodiments, the support frame may be installed as a permanent structure. A boat landing and mini platform may be mounted on the conductor pipe or the conductor clamps supported by a support frame.

U.S. Pat. No. 4,687,380 issued to Meek provides a tower structure having a central column, three support legs and a base structure which can be anchored to the sea bed by means of piles. The legs and base structure are constructed as an integral pre-formed base unit with a sleeve attached to the upper ends of the legs.

The column is slidingly engaged within the sleeve of the base unit. A rigid connection is made between the column and the sleeve. In the erected structure, the primary load of the column is transmitted through the column and sleeve connection via the base unit to the sea bed.

SUMMARY OF THE PRESENT INVENTION

Many of the prior art structures are very complicated, expensive to manufacture and expensive to install devices which require expensive and complicated permanent members which surround and support the conductor pipe. It is an object of the present invention to provide a simple straightforward solution to the problem of installing and supporting the conductor pipe and a supporting truss by using the drilling rig that installs the conductor pipe to also install the truss, while also using the conductor pipe itself as one of the legs of a structure and in combination with two other legs in order to form a composite structure which fully supports and protects the well conductor pipe. With the present invention, there is no need to provide a multi-legged jacket which is permanently secured to the sea bed using piling which is driven into the sea bed and through or adjacent the legs of the jacket.

With the present invention, a simple easily constructed, easily installed apparatus is provided which affixes using removable connections such as clamps for example to the conductor pipe at spaced positions along the conductor pipe.

The present invention provides method of installing a lean-to well protector apparatus for use on an offshore well having a generally vertically upstanding conductor pipe extending between the sea bed and the water surface. The drilling rig that installs the conductor pipe also places a truss having a pair of jacket legs defining a plane that is angularly oriented with respect to the conductor pipe forming an acute angle therewith. Drive piles preliminarily installed in each of the jacket legs so that the drilling rig can immediately anchor the jacket to the seabed by driving the pre-installed piles. A first plurality of structural chord members interconnects the jacket legs and forms therewith a truss that leans toward the conductor pipe, the truss being closer to the conductor pipe at the top end portion of the truss and further from the conductor pipe at the lower end portion of the truss. A first connector is positioned during operation of the offshore well at generally the middle portion of the conductor pipe, generally between the sea bed and the water surface for forming a first connection of the truss to the conductor pipe. A second connector is positioned during operation of the offshore well at generally the top portion of the conductor pipe near the water surface area for forming a second connection of the truss to the conductor pipe. A plurality of structural chord members interconnects the conductor pipe with the truss and at least some of the second plurality of structural chord members extends between the truss and the first and second connectors.

In the preferred method, the first and second connectors each use removable clamp assemblies;

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figures 1, 4, 5:
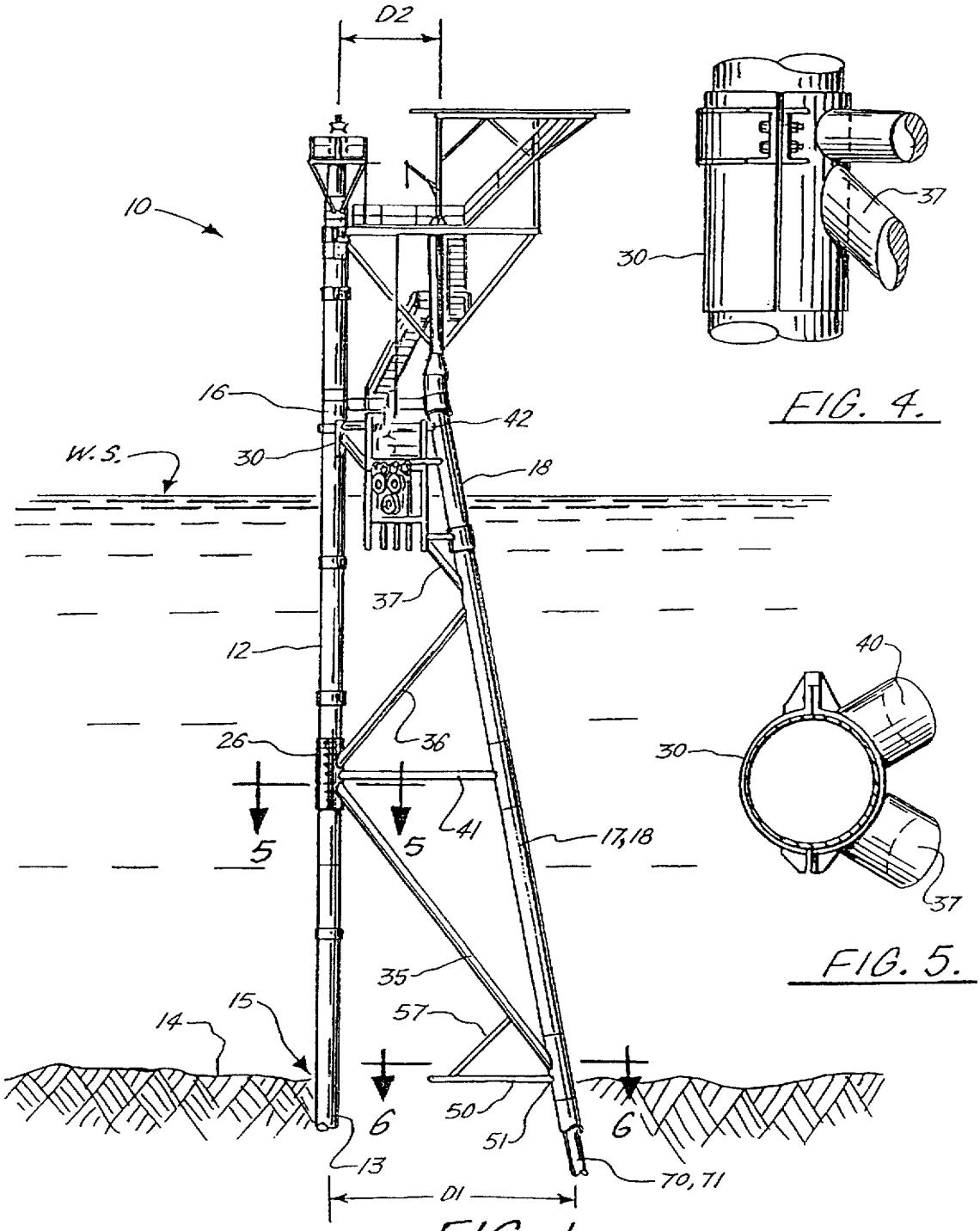
FIG. 1 is an elevational view of the preferred embodiment of the apparatus of the present invention after installation.
FIG. 4 is a fragmentary view illustrating the top clamp portion of the preferred embodiment of the apparatus of the present invention.
FIG. 5 is a sectional view taken along lines 5—5 of FIG. 1.

FIGS. 1–6 thus illustrate the preferred embodiment of the apparatus of the present invention designated generally by the numeral 10. In FIG. 1, there can be seen a conductor pipe 12 which is a vertically, upstanding tubular member having a lower 13 and an upper 16 end portion with the conductor pipe being of substantially constant uniform diameter between its lower 13 and upper 16 end portions. An exemplary diameter for conductor pipe might be twenty to forty eight (20–48) inches. The conductor pipe extends to the, sea bed 14 at lower end 15 and at its upper end portion 16, the conductor pipe 12 extends up to and above the water surface WS.

The conductor pipe is a commercially used construction which is typically installed on offshore oil and gas wells when the well is completed. The present invention provides an improved lean-to well protector apparatus 10 for use on offshore wells having a generally vertically upstanding conductor pipe 12 which extends between the sea bed 14 and the water surface WS. The lean-to truss apparatus 10 includes a pair of hollow tubular jacket legs 17, 18 that are angularly oriented with respect to the conductor pipe 12 forming an acute angle therewith. In accordance with the method of the present invention, the conductor pipe 12 is installed with a drilling rig (see FIGS. 9A–9H) which also sets the lean-to truss apparatus 10 and drives pre-installed drive piles 70, 71 contained respectively within legs 17, 18.

Each jacket leg 17, 18 includes respective lower end portions 17A, 18A and respective upper end portions 17B, 18B. The lower end portions 17A, 18A can extend into the sea bed or merely terminate at or near the sea bed. Pre-installed drive piles 70, 71 are put inside each leg 17, 18.

Figure 2:
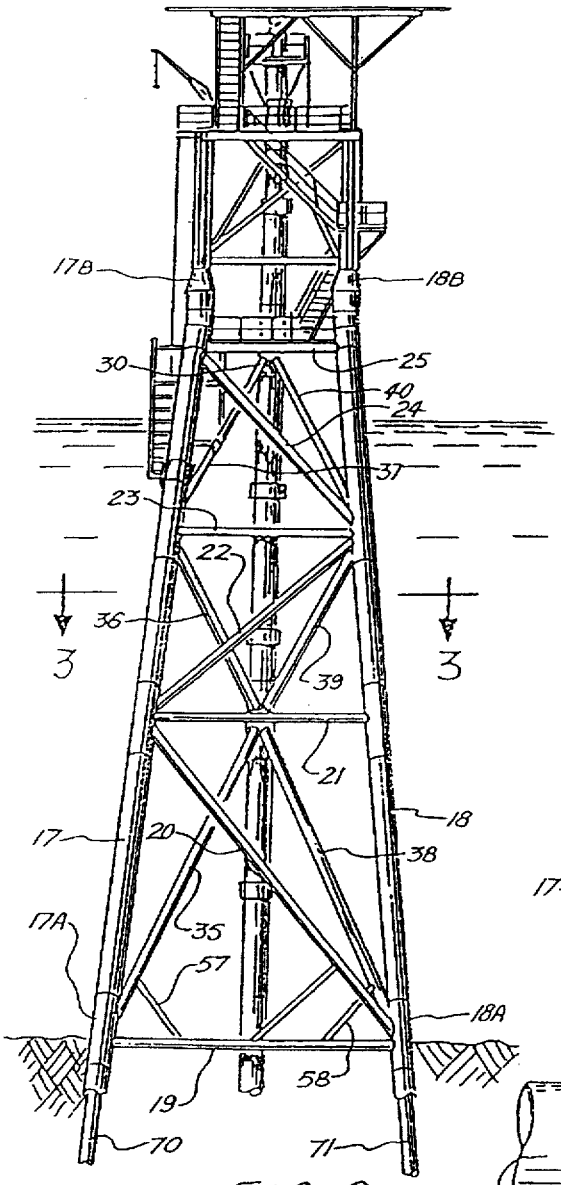
FIG. 2 is a side elevational view of the preferred embodiment of the apparatus of the present invention after installation.
Figure 6:
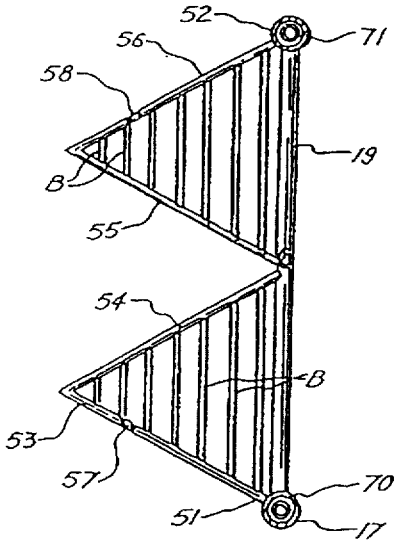
FIG. 6 is a sectional view taken along lines 6—6 of FIG. 1.
Figure 3:
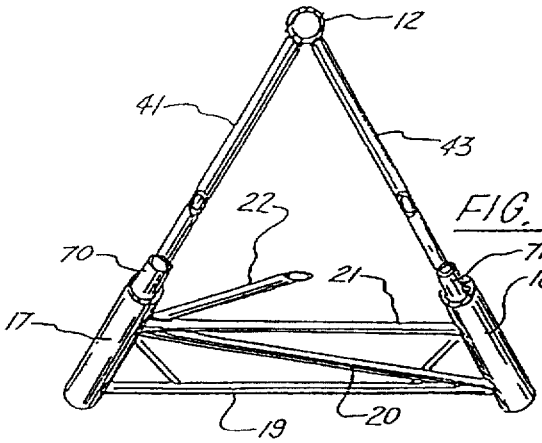
FIG. 3 is a sectional view taken along lines 3—3 of FIG. 2.

A first plurality of structural chord members 19–25 interconnect the jacket legs 17, 18 and form in combination therewith a truss that leans toward the conductor pipe 12, the truss being spaced closer to the conductor pipe 12 at the top end portion of the truss as shown in FIG. 1, and farther from the conductor 12 pipe at the bottom end portion of the truss. As an example, in apparatus 10 as shown in FIGS. 1 and 2, the mud line could be for example at an elevation of approximately 85–90 feet below the water surface. Thus the conductor pipe 12 might be approximately 100 feet long referencing that portion of the conductor pipe 12 which extends from lower end portion 15 at the sea bed 14 to the uppermost end portion 16 of the conductor pipe. In such a situation where water depth would be on the order of 85–90 or example, the jacket legs 17, 18 could be approximately 105 feet long and spaced a distance D1 from the conductor pipe 12 of 40 feet at the bottom 17A, 18A end portion of each jacket leg 17, 18 at the sea bed 14. In such an example, the spacing between the legs 17, 18, and the conductor pipe 12 would be a distance D2, on the order of 20 feet, at the top end portions 17B, 18B of the jacket legs 17, 18. It should be understood that these dimensions are exemplary and also that these are lateral spacing dimensions with respect to conductor pipe 12 and the plane defined by legs 17, 18 as applied to the elevational view of FIG. 1.

A first removable clamp 26 is positioned during operation of the offshore well (i.e., after the conductor is in its vertical upright position) at generally the middle portion of the conductor pipe 12 generally between the sea bed 14 and the water surface WS. The removable clamp 26 forms a first connection of the truss to the conductor pipe 12. A second removable clamp 30 is positioned during operation of the offshore well at generally the top 16 portion of the conductor pipe near the water surface WS area for forming a second connection of the truss to the conductor pipe 12.

A second plurality of structural chord members interconnects the conductor pipe 12 with the truss and at least some of the second plurality of structural chord members extend between the truss and the first and second clamps 26, 30. Thus, in FIG. 1 there can be seen a plurality of diagonally extending members 35–37 which extend between leg 17 and clamp 26. The diagonal member 37 extends between the leg 17 and clamp 30. In like manner, a plurality of diagonal members extend between jacket leg 18 and clamp 26 including diagonal member 38–39. A diagonal member 40 extends between leg 18 and upper removable clamp 30. Chord member 41 extends between leg 17 and clamp 26 while horizontal chord member 42 extends between the upper end 18B of leg 18 and clamp 30. Similarly, a horizontal chord member 43 extends between leg 18 and conductor 12.

Mud mat 50 is positioned at the bottom 17A, 18A of jacket legs 17, 18 extending at least a partial distance therefrom laterally toward the bottom 13 of conductor 12 and along the sea bed 14. The mud mat 50 attaches at 51 to leg 17 and at 52 to leg 18. Mud mat 50 begins at horizontal chord member 19 and extends laterally therefrom toward conductor pipe 12. The mud mat 50 further comprises a plurality of diagonally extending beams 53–56 interlaced with a plurality of parallel beams B (see FIG. 6). A pair of diagonal struts 57, 58 connect mud mat 50 with diagonal members 35, 38 respectively.

Figure 7:
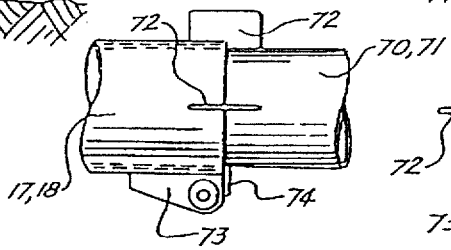
FIGS. 7 and 8 are fragmentary side and end views respectively illustrating the pre-installed drive piles positioned within the jacket legs.
Figure 8:
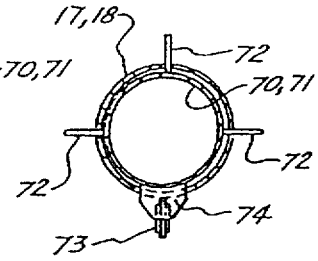

FIG. 7 and 8 illustrate the pre-installed drive piles designated by the numerals 70, 71. The jacket legs 17, 18 include a hollow bore (see FIG. 8) into which the preinstalled pilings 70, 71 are positioned. A gusset 72 can be used to weld piling 70, 71 to the jacket legs 17, 18 respectively. Further, a lifting eye 73 can be supplied to the jacket leg 17, 18 adjacent the end portion thereof. Driving of the piling 70, 71 into the seabed can be used to anchor the jacket legs 17, 18 to the seabed. The gusset 72 is installed when the apparatus is constructed. This gusset 72 is simply removed prior to driving of the piling 70, 71.

The lean-to apparatus 10 of the present invention thus provides a two leg jacket assembly with pre-installed drive piles which can be used in combination with a conductor pipe to provide an easy to manufacture, easy to assemble and easy to erect lean-to well protector apparatus for offshore oil and gas wells. The apparatus can be installed on site by the same drilling rig that installs the conductor pipe.

The apparatus can be made of any suitable structural material which is known in the art of constructing offshore oil and gas well jackets such as structural steel.

FIGS. 9A–9H illustrate the method of the present invention.

Figure 9A:
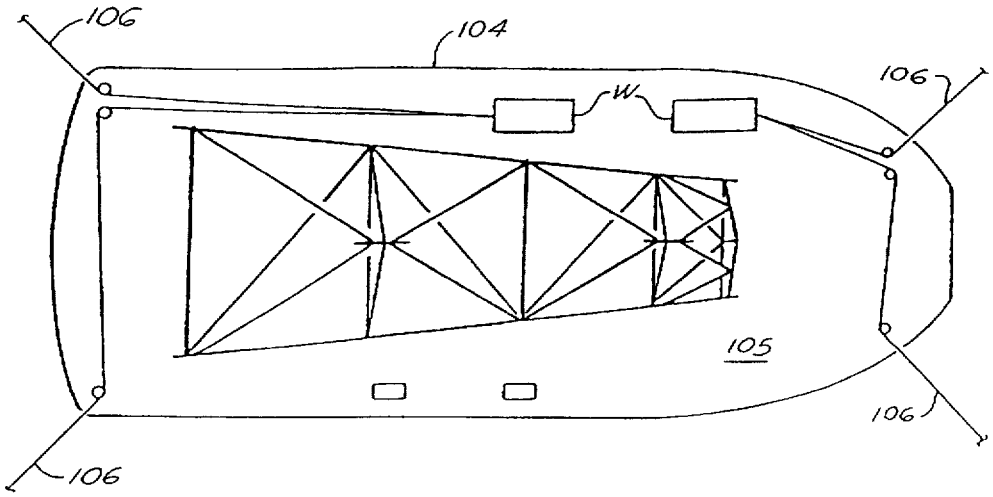
FIG. 9A–9H are sequential, schematic views illustrating the method of the present invention.
Figure 9A:
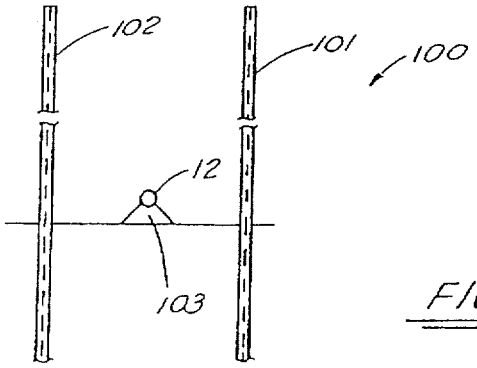

In FIG. 9A, the drilling rig 100 is shown in plan view and schematically. The drilling rig includes a skid beam substructure 101, 102. Conductor 12 is braced at 103 to rig 100. While schematically illustrated in FIG. 9A, it should be understood that this arrangement is conventional as relates to the installation of a conductor 12 using a mobile drilling rig 100. A barge-like vessel 104 supports jacket 10 upon its upper surface or deck 105. A plurality of anchor lines 106 supports the barge 104 in an operative position. Winches W are schematically shown for operating the anchor lines 106.

Figure 9B:
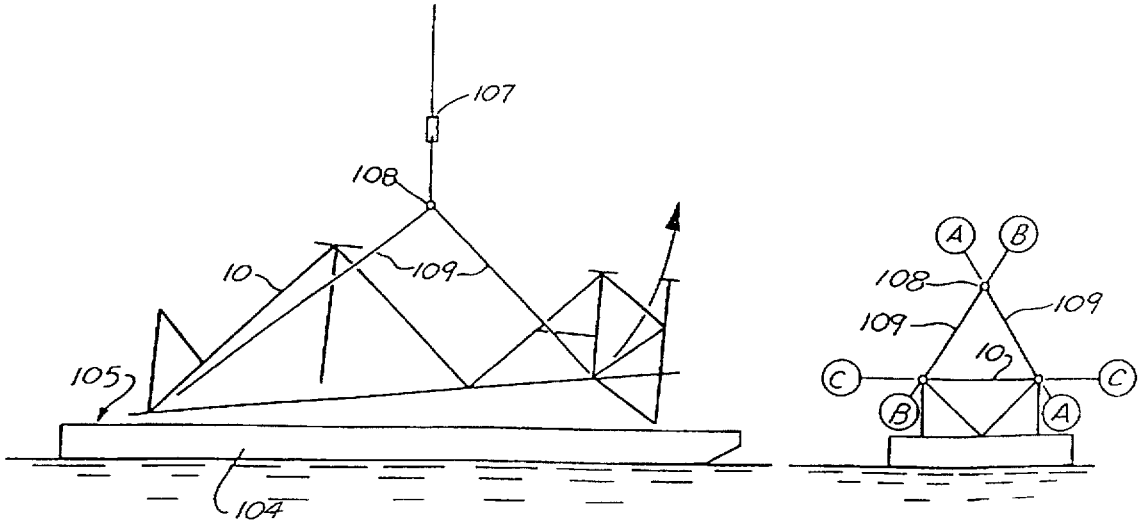

In FIG. 9B, a side view illustrates an initial removal of the jacket 10 from the deck 105 of the barge-like vessel 104. A lifting assembly 107 is attached to and supported by the drilling rig crown block (not shown). The lifting assembly 107 is conventional and is an associated portion of the crown block which typically forms the lifting device of a conventional marine drilling rig. Spreader bar 108 and sling 109 are used to form the lifting 107 for lifting the jacket 10. The lifting assembly 107 can be for example, a drill string with tongs attached thereto. The tongs would then form a connection the the spreader bar 108.

Figure 9C:
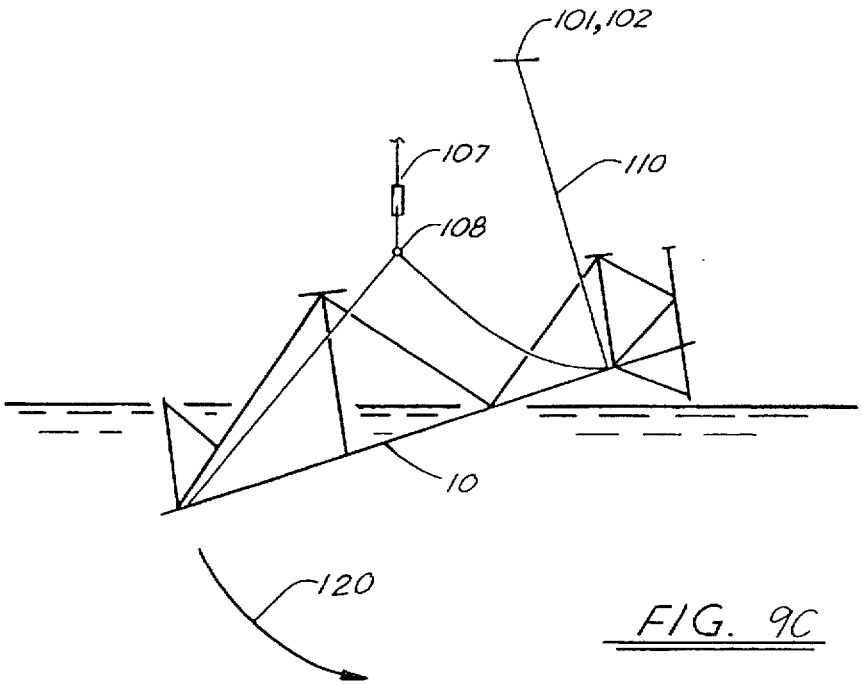

In FIG. 9C, the barge 104 has been removed a second lift line 110 is shown attached to jacket 10. The line 110 is attached to using a padeye for example to the skid beam substructure 101, 102. As the line 107 is lowered, the rig rotates as shown by the arrow 120 in FIG. 9C.

Figure 9D:
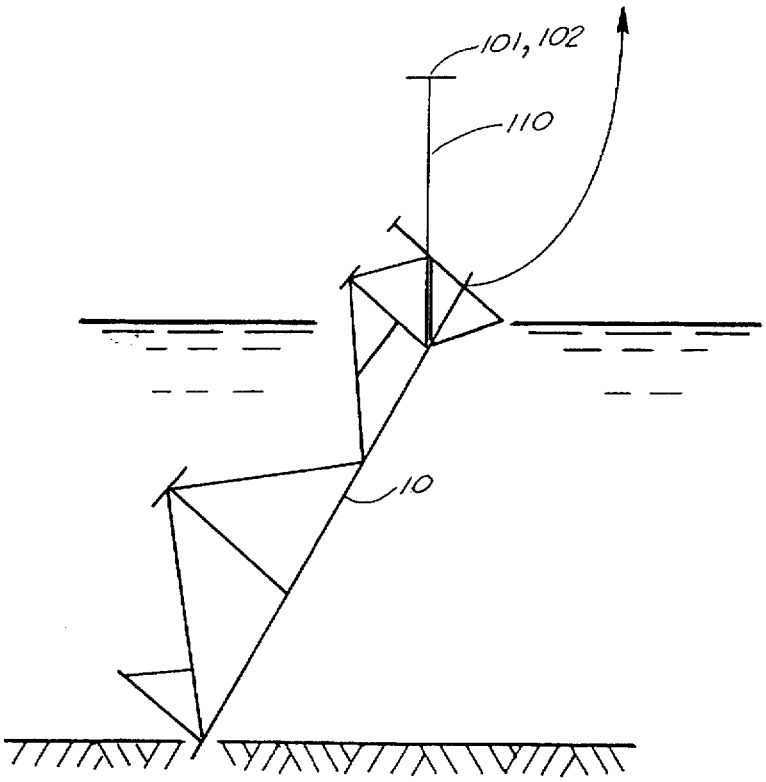
Figure 9E:
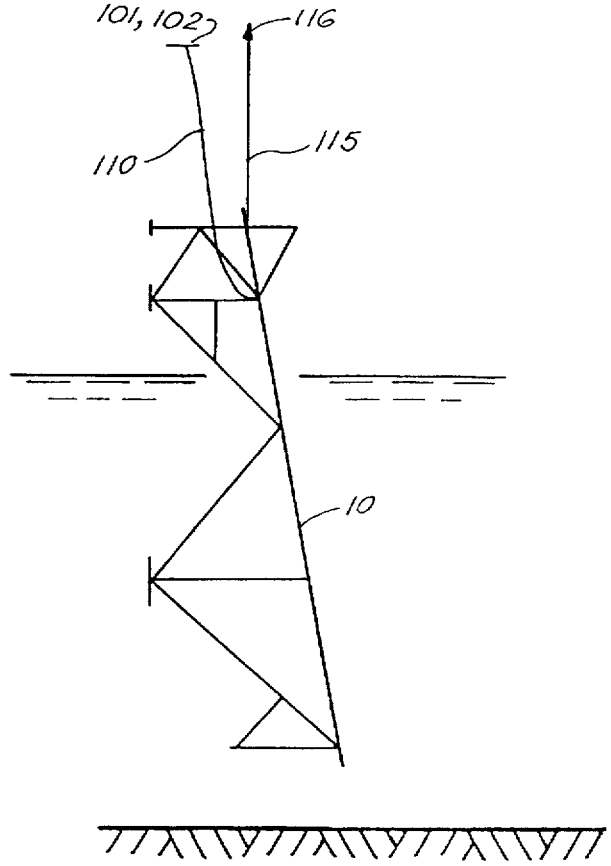
Figure 9F:
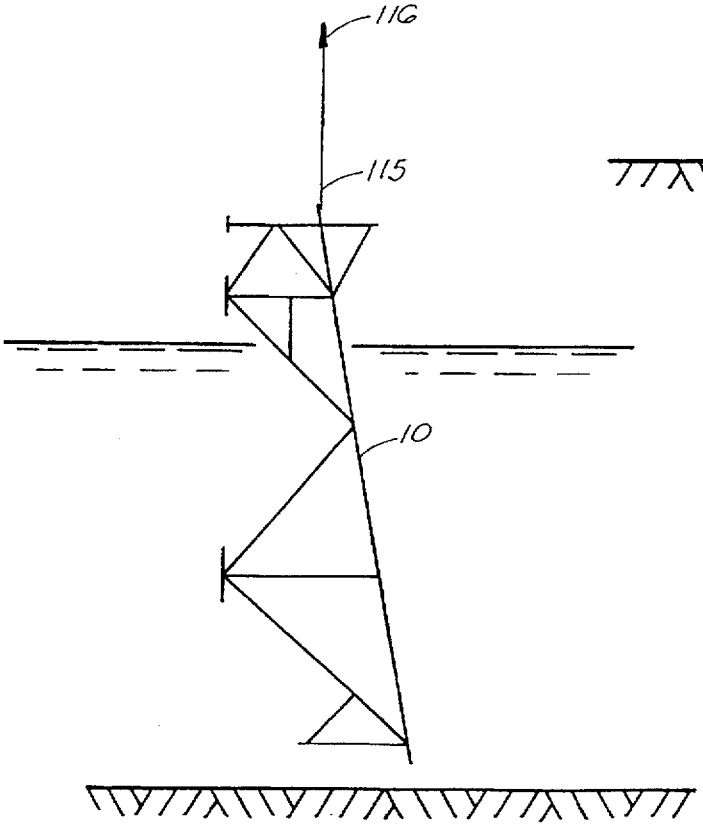

In FIG. 9D, the bottom of jacket 10 has rotated to the mud line. The crown block and lifting assembly 107 are disconnected from the jacket 10, and line 110 supports the jacket 10. In FIGS. 9E and 9F, there is shown an orientation of the jacket 10 in a substantially vertical position. The lifting sling 110 is disconnected from the skid beam substructure 101, 102 after the crown block is reattached to jacket 10 using line 115. The line 115 is located in a position that insures that the jacket 10 is supported in a substantially vertical position.

Figure 9G:
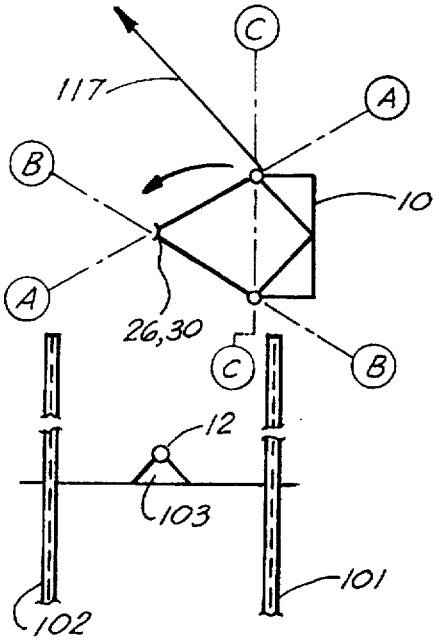
Figure 9H:
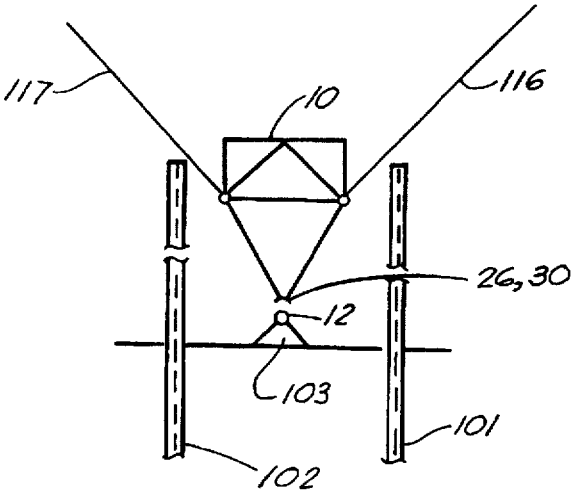

In the plan views of FIGS. 9G and 9H, a rotation of the jacket 10 is shown from a perpendicular position with respect to the substructure 101, 102 (FIG. 9G) to a position adjacent the substructure 101, 102 (FIG. 9H). The skid substructure 101, 102 is moved in a direction which is required in order to move the jacket 10 towards the conductor 12 for attachment thereto using clamps 26, 30 which are associated with jacket 10 as afore described with respect to FIGS. 1–8. Tugger lines 116, 117 as needed aid in positioning the jacket 10.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A method of installing an offshore oil/gas well with a mobile drilling rig having a lifting device thereon that is transported to an offshore well site, comprising the steps of:

a) installing an upstanding conductor pipe with the drilling rig at the well site in a first well drilling position;

b) transporting a jacket truss to the well site using a floating barge-like vessel, the truss including a pair of elongated hollow legs;

c) preliminarily installing drive piles in each leg of the jacket truss;

d) lifting the jacket truss from the barge using the lifting device on the drilling rig and wherein the drilling rig remains in said first well drilling position;

e) positioning the jacket truss adjacent the conductor pipe using the drilling rig and its lifting device in said first position;

f) securing the jacket truss to the conductor pipe using one or more removable clamps each spaced substantially above the sea bed; and g) securing the jacket legs to the sea bed by driving the drive piles with the mobile drilling rig.

2. The method of claim 1, further comprising the step of installing mud mat means extending along the sea bed and defining an extended load, transfer surface with connects at one edge portion to the bottom portion of the truss and at least partially projects from the truss toward the conductor pipe a distance, the mud mat means defining a load transfer surface for supporting the bottom end portion of the truss at the sea bed during installation.

3. The method of claim 1, wherein:

the truss further comprises a first plurality of structural chord members.

4. The method of claim 3, wherein:

a second plurality of structural, chord members interconnects the truss and the conductor pipe.

5. The method of claim 4, further comprising the step of installing mud mat means extending along the sea bed and defining an extended load transfer surface which connects at one edge portion to the bottom portion of the truss and at least partially projects from the truss toward the conductor pipe a distance, the mud mat means defining a load transfer surface for supporting the bottom end portion of the truss at the sea bed during installation.

6. The method of claim 1, wherein:

a plurality of structural chord members interconnects the truss and the conductor pipe.

*7. A method of installing an offshore oil/gas well with a mobile drilling rig having a lifting device thereon that is transported to an offshore well site, comprising the steps of:*

*a) installing an upstanding conductor pipe with the drilling rig at the well site in a first well drilling position;*

*b) transporting a jacket truss to the well site using a floating barge-like vessel, the truss including a pair of elongated hollow legs;*

*c) installing drive piles in each leg of the jacket truss;*

*d) lifting the jacket truss from the barge using the lifting device on the drilling rig and wherein the drilling rig remains in said first well drilling position;*

*e) positioning the jacket truss adjacent the conductor pipe using the drilling rig and its lifting device in said first position;*

*f) securing the jacket truss to the conductor pipe using one or more removable clamps each spaced substantially above the sea bed; and*

*g) securing the jacket leas to the sea bed by driving the drive piles with the mobile drilling rig.*

* * * * *